US009233859B2

(12) United States Patent
Gelis et al.

(10) Patent No.: US 9,233,859 B2
(45) Date of Patent: Jan. 12, 2016

(54) MICROFLUIDIC PROCESS MONITOR FOR INDUSTRIAL SOLVENT EXTRACTION SYSTEM

(71) Applicants: Artem Gelis, Naperville, IL (US); Candido Pereira, Naperville, IL (US); Kevin Paul Flood Nichols, Seattle, WA (US)

(72) Inventors: Artem Gelis, Naperville, IL (US); Candido Pereira, Naperville, IL (US); Kevin Paul Flood Nichols, Seattle, WA (US)

(73) Assignee: UCHICAGO ARGONNE, LLC., Chicago, IL (US)

( * ) Notice: Subject to any disclaimer, the term of this patent is extended or adjusted under 35 U.S.C. 154(b) by 281 days.

(21) Appl. No.: 14/067,560

(22) Filed: Oct. 30, 2013

(65) Prior Publication Data
US 2015/0090596 A1  Apr. 2, 2015

Related U.S. Application Data

(60) Provisional application No. 61/884,804, filed on Sep. 30, 2013.

(51) Int. Cl.
*C02F 1/46* (2006.01)
*C02F 1/461* (2006.01)
*C02F 101/20* (2006.01)
(Continued)

(52) U.S. Cl.
CPC ............ *C02F 1/46104* (2013.01); *C02F 1/4672* (2013.01); *C02F 2101/006* (2013.01); *C02F 2101/20* (2013.01); *C02F 2201/4611* (2013.01); *C02F 2201/46105* (2013.01)

(58) Field of Classification Search
CPC .............. C02F 2201/4611; C02F 2201/46105; B01L 3/5027; B01L 3/502707; B01L 3/502769
See application file for complete search history.

(56) References Cited

U.S. PATENT DOCUMENTS 7,268,167 B2  9/2007  Higuchi et al.
7,537,746 B2  5/2009  Matsubara et al.
(Continued)

FOREIGN PATENT DOCUMENTS

JP  WO 2002/068104  6/2002
JP  WO 2005/089921  9/2005

OTHER PUBLICATIONS

Kevin P. Nichols, et al. Toward a Mechanistic Understanding of Nuclear Reprocessing Chemistries by Quantifying Lanthanide Solvent Extraction Kinetics via Microfluidics with Constant Interfacial Area and Rapid Mixing, J. Am. Chem. Soc. 2011, 133, 15721-15729.

*Primary Examiner* — Nicholas A Smith
*Assistant Examiner* — Brian W Cohen
(74) *Attorney, Agent, or Firm* — Cherskov Flaynik & Gurda, LLC

(57) ABSTRACT

The present invention provides a system for solvent extraction utilizing a first electrode with a raised area formed on its surface, which defines a portion of a microfluidic channel; a second electrode with a flat surface, defining another portion of the microfluidic channel that opposes the raised area of the first electrode; a reversibly deformable substrate disposed between the first electrode and second electrode, adapted to accommodate the raised area of the first electrode and having a portion that extends beyond the raised area of the first electrode, that portion defining the remaining portions of the microfluidic channel; and an electrolyte of at least two immiscible liquids that flows through the microfluidic channel. Also provided is a system for performing multiple solvent extractions utilizing several microfluidic chips or unit operations connected in series.

20 Claims, 7 Drawing Sheets

(51) Int. Cl.
   *C02F 1/467* (2006.01)
   *C02F 101/00* (2006.01)

(56) References Cited

U.S. PATENT DOCUMENTS

| | | |
|---|---|---|
| 7,553,434 B2 | 6/2009 | Kawai et al. |
| 7,595,195 B2 | 9/2009 | Lee et al. |
| 7,708,949 B2 | 5/2010 | Stone et al. |
| 7,776,927 B2 | 8/2010 | Chu et al. |
| RE41,780 E | 9/2010 | Anderson et al. |
| 7,909,971 B2 | 3/2011 | Nuzzo et al. |
| 7,985,058 B2 | 7/2011 | Gray |
| 8,066,918 B2 | 11/2011 | Noritomi et al. |
| RE43,365 E | 5/2012 | Anderson et al. |
| 8,337,778 B2 | 12/2012 | Stone et al. |
| 8,354,085 B1 | 1/2013 | Guelis |
| 2004/0166504 A1 | 8/2004 | Rossier et al. |
| 2007/0196397 A1 | 8/2007 | Torii et al. |
| 2008/0044312 A1* | 2/2008 | Malito ............ B01L 3/5027 422/68.1 |

* cited by examiner

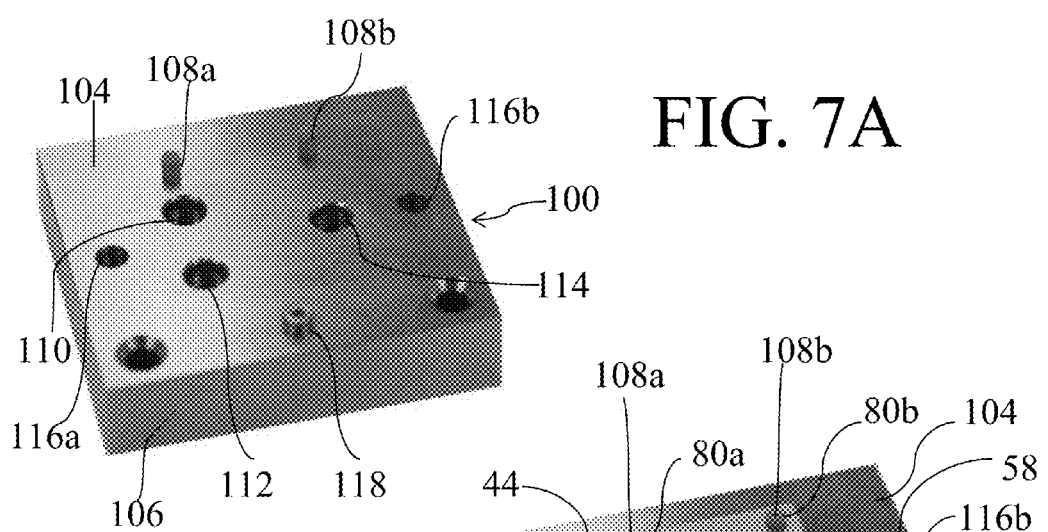
FIG. 7A
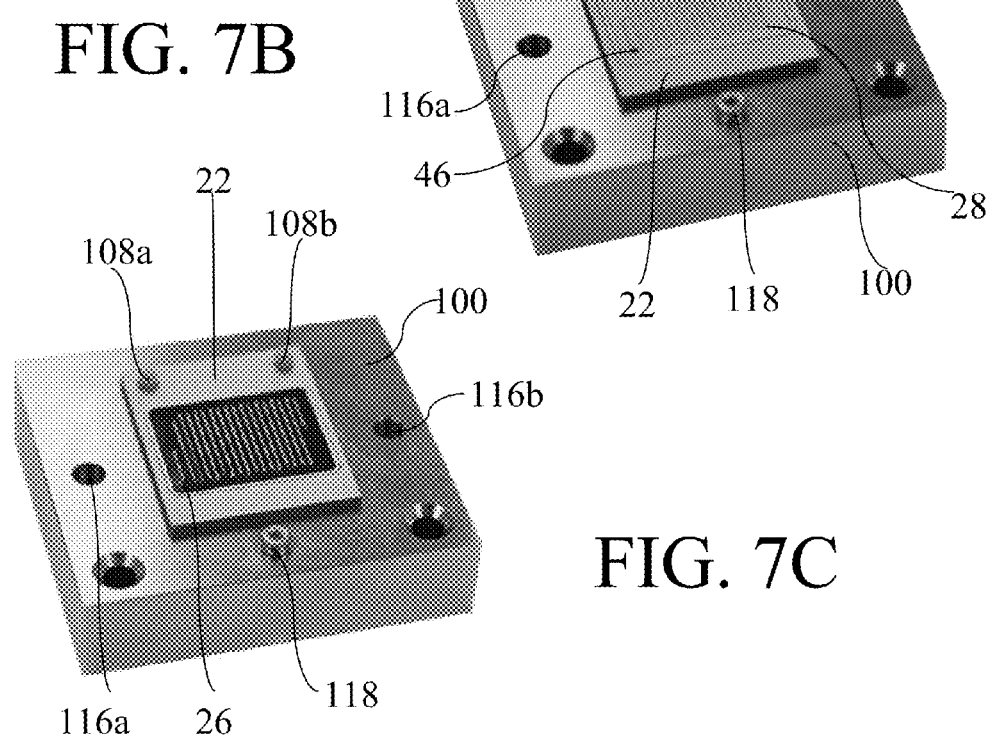
FIG. 7B
FIG. 7C

MICROFLUIDIC PROCESS MONITOR FOR INDUSTRIAL SOLVENT EXTRACTION SYSTEM

PRIORITY

This utility application claims the benefits of U.S. Provisional Patent Application No. 61/884,804, filed on Sep. 30, 2013.

CONTRACTUAL ORIGIN OF THE INVENTION

The United States Government has rights to this invention pursuant to Contract No. DE-AC02-06CH11357 between the United States Government and UChicago Argonne, LLC representing Argonne National Laboratory.

BACKGROUND OF THE INVENTION

1. Field of the invention

This invention relates to extracting moieties from a process stream, and more specifically, this invention relates to a system of solvent extraction using a combination of an electrochemical cell and a microfluidic chip to isolate a particular element or compound from a mixture of elements or compounds.

2. Background of the Invention

Waste streams and process streams need to be monitored regularly to determine system efficiencies and to assure environmental safety. Some process streams are more difficult than others to monitor. Nuclear process streams are the difficult ones, particularly if these streams are to be monitored in real time. For example, on-line and real time monitoring of process streams containing complex mixtures of lanthanides and actinides is difficult given that these mixtures often produce interfering signals prior to analysis. Rare earth element processing plants and nuclear material treatment facilities pose significant challenges.

Liquid-liquid extraction, or solvent extraction, may be used to separate moieties in process scale applications. Solvent extraction involves the use of two different immiscible liquids where extraction occurs as the desired substance moves from one liquid phase to another liquid phase. This process is expensive given that large volumes of extraction fluids are used and that the samples must be sent to a laboratory for processing. Also, process scale fluid volumes prevent the use of microscale equipment inasmuch as the processing of large fluid volumes are associated with relatively large Reynolds numbers (i.e., chaotic fluid flows and other instabilities) which are not tolerated by the smaller reaction chambers defined by microscale equipment. As such, real time determination of target moiety concentrations are not possible with state of the art macro-scale processing.

A need in the art exists for a low-cost system for determining moiety concentrations in process streams that is capable of being performed at the microliter scale. The system should enable real-time process control of refining plants as well as the inexpensive production of small volumes (between 5 microliters (µl) and 20 µl) of slip stream aliquots) of high purity substances from slip stream aliquots derived from nuclear and rare earth process streams.

SUMMARY OF THE INVENTION

An object of the present invention is to provide a microfluidic device and system for isolating microscale amounts (e.g. between 5 and 20 microliters) of target moieties that overcomes many of the disadvantages of the prior art.

Another object of the present invention is to provide a system that utilizes a combination of a microfluidic chip and an electrochemical cell to separate electro-active elements or compounds from an analysis stream. A feature of the present invention is that surfaces defining the chip facilitate laminar fluid flow (i.e., in a low Reynolds number regime, of between approximately 0.1 and approximately 2000). An advantage of the invention is a minimization of factors which influence rate-dependent chemistry such that on-site determination is enabled.

Another object of the present invention is to provide a system of microfluidic chips to isolate metals (e.g., plutonium, uranium, strontium, technetium, cesium) from a nuclear fuel reprocessing stream for later analysis. A feature of the system is the use of solvent extraction as part of a process monitor. An advantage of the invention is that analysis of process streams are enabled, with relatively smaller waste volumes (less than 250 microliters) generated, even over a protracted period of time. Smaller waste volumes are obtained because the presently invented system allows for several aliquots to be analyzed individually through extraction of smaller volumes over a given time.

Still another object of the present invention is to provide a system whereby interfering signals from constituent elements in complex mixtures of lanthanides and actinides are reduced through the selective isolation of desired constituents. A feature of the present invention is that a desired element or compound can be selectively isolated in real time by applying a voltage across the electrochemical cell unique to the redox potential of the desired element or compound. An advantage of the invention is that target moieties can be isolated to greater than 99.99% purity.

Yet another object of the present invention is to provide a series of microfluidic chips operating in series or in parallel in which each microfluidic chip selectively isolates a desired element or compound. Alternatively, a single multiflow chip is provided. A feature of the present invention is that, in multi-chip, series configurations (whereby a second chip is situated downstream from a first chip and perhaps a third chip is situated downstream from the second chip), the output from one cell can be phase separated and flow immediately into another microfluidic chip. An advantage of the present invention is that there is no practical limit to the number of microfluidic chips that may be joined. In an embodiment of the invention, wherein a multi-flow direction single chip is utilized, separate chemical unit operations are enabled on the same physical chip. In this embodiment, each of the unit operations is flowing counter current to each other. In such an embodiment, the aqueous raffinate from one microfluidic chip is fed to a downstream microfluidic chip as the aqueous feed. The organic phase is fed countercurrent to the aqueous phase so that it is fed to an upstream unit. In this way, high purity separations can be achieved after a number of flow circuits are completed.

Yet another object of the present invention is to separate elements or compounds entrained in process streams. A feature of the invention is that no extraction solvents are added to the process streams. An advantage of the present invention is that there is no need for difficult solvent feed preparation.

Still another object of the present invention is providing an on-line, at-line, real time system to monitor a process. A feature of the invention is that approximately 10 microliters of fluid are continuously extracted from a slip stream or analysis stream for analysis in a solvent extraction reaction chamber having a volume to surface area ratio of between approximately 500 m$^{-1}$ and approximately 20,000 m$^{-1}$', with a first subrange being from about 5000 to about 15,000 m$^{-1}$ and a second subrange being from about 8000 to about 12,000 m$^{-1}$ An advantage of the invention is the solvent extraction and analysis of these small aliquots allow for continuously updating the data reflecting the real time conditions of the process.

Briefly, the present invention provides a system for solvent extraction, said system comprising a first electrode with a first surface and a second surface, wherein a raised area is formed on the first surface of said first electrode and wherein the raised area defines one surface of a four-sided microfluidic channel; a second electrode with a first surface and a second surface, wherein the second surface is flat and wherein the second surface defines a surface of the microfluidic channel that opposes the raised area of the first electrode; a reversibly deformable substrate disposed between the first surface of said first electrode and the second surface of said second electrode, wherein the substrate is adapted to accommodate the raised area on the first surface of the first electrode and wherein said substrate has a portion that extends beyond the raised area of the first surface of the first electrode, wherein the portion that extends beyond the raised area defines the remaining two sides of the microfluidic channel; and a liquid electrolyte that flows through the microfluidic channel, wherein said liquid electrolyte is comprised of at least two immiscible liquids and wherein at least one immiscible liquid has at least two dissolved constituents.

Also provided is a system for performing liquid-liquid extraction, said system comprising a number of microfluidic chips in series, or separate unit operations on the same chip, said microfluidic chips comprising a first electrode with a first surface and a second surface, wherein a raised area is formed on the first surface of said first electrode and wherein the raised area defines one surface of a four-sided microfluidic channel; a second electrode with a first surface and a second surface, wherein the second surface has a topography complementary to the first surface of the first electrode (e.g., the second surface is generally flat when the first surface is generally flat) and wherein the second surface defines a surface of the microfluidic channel that opposes the raised area of the first electrode; a gasket disposed between the first surface of said first electrode and the second surface of said second electrode, wherein the channel formed between the electrodes define a high volume to surface area ratio solvent extraction chamber. As such, the channel may be serpentine in structure, with a first means of ingress and a first means of egress. Alternatively, the channel may have a plurality of means of ingress and an equal number of means of egress to accommodate countercurrent flow of different fluids.

In an embodiment of the system, the gasket is adapted to accommodate the raised area on the first surface of the first electrode and wherein said gasket has a portion that extends beyond the raised area of the first surface of the first electrode, wherein the portion that extends beyond the raised area defines the remaining two sides of the microfluidic channel; and a liquid electrolyte that flows through the microfluidic channel, wherein said liquid electrolyte is comprised of at least two immiscible liquids and wherein at least one immiscible liquid has at least two dissolved constituents; and a phase separator, wherein the phase separator separates the at least two immiscible liquids into separate streams upon exiting the microfluidic channel.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 7A-7F depict the steps of assembling the microfluidic chip on a mount in accordance with the features of the present invention.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention is directed to a system for separating targeted actinide or lanthanide elements from other actinides and lanthanide such that while all of the moieties are present in an initial, single phase process stream, the moieties are separated into different phases within a modified analysis stream. The separation occurs simultaneous with the extraction of a sample aliquot from the process stream.

The invention allows determination of the rate constants for interfacial transfer of all lanthanides, plus yttrium, under TALSPEAK/ALSEP process conditions. TALSPEAK (Trivalent Actinide-Lanthanide Separations by Phosphorus reagent Extraction from Aqueous Complexes) is a process for separating americium and curium from the lanthanides by extraction from an aqueous solution of an aminopolyacetic acid complex with a monoacidic organophosphate or a phosphonate. ALSEP is an industry-wide acronym for actinide and lanthanide separation processes. The invention is also utilized to generate solvent extraction kinetic data. For example, an embodiment of the invention can be utilized for Eu and Am stripping in the ALSEP process. This ALSEP iteration is further disclosed in U.S. Pat. No. 8,354,085, granted on Jan. 15, 2013, the contents of which are hereby incorporated by reference.

An embodiment of the invention provides a microfluidic chip (capable of holding up to 1000 μl of aliquot) to facilitate controlled oxidation of target moieties and to maintain externally obtained oxidation states, all prior to analysis. This oxidation state control of various target moieties occurs during separation processes by maintaining a voltage across the chip until the final physical isolation of the target moieties.

The microfluidic electrode chip comprises a high surface-area reaction pathway in contact with both auxiliary and working electrodes. The chip features a high surface to volume area to enable efficient oxidation or reduction of a species of interest prior to analysis.

Figure 1:
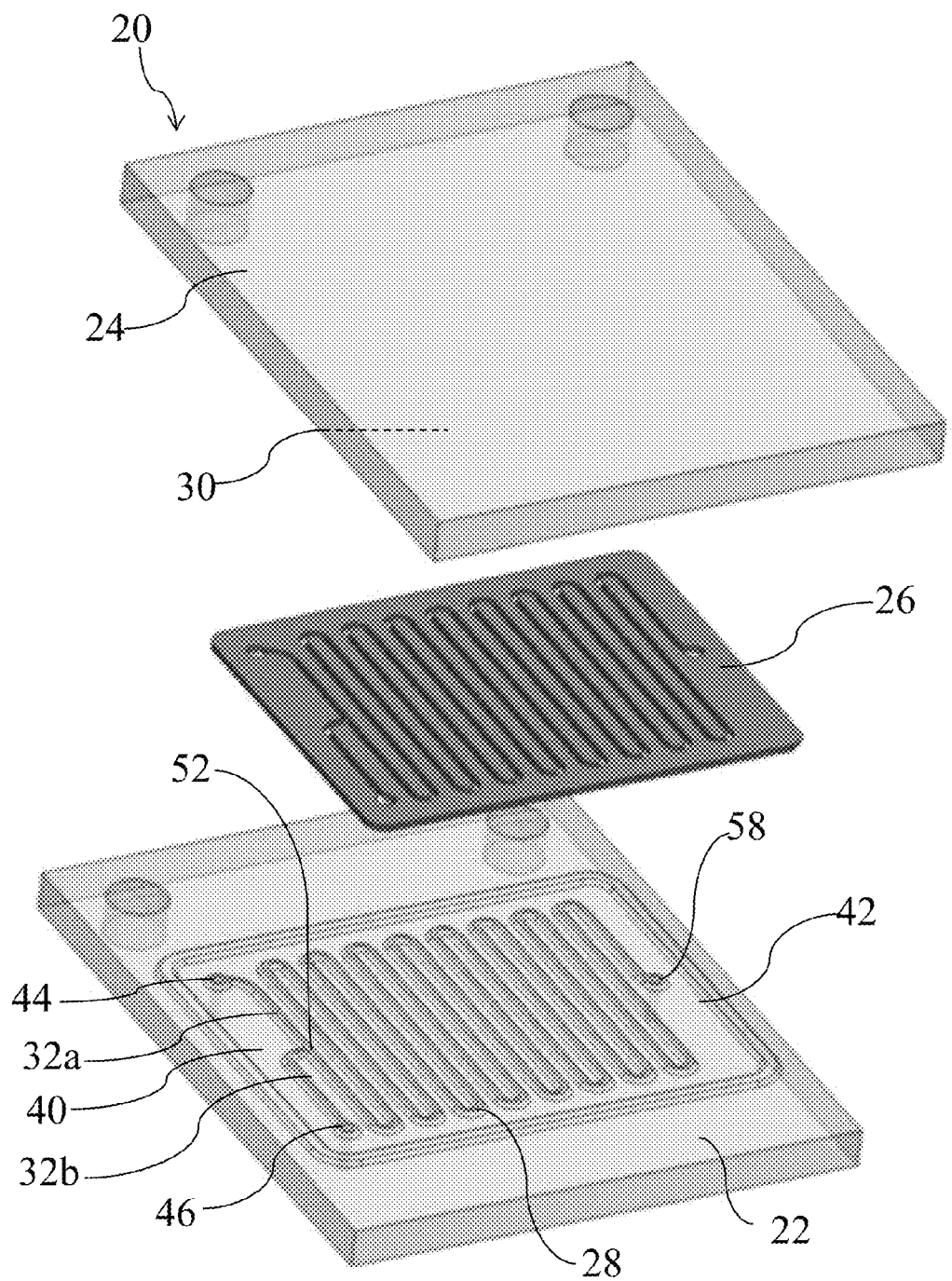
FIG. 1 is an exploded view of the present invention.

As depicted in FIG. 1, the present invention can be characterized, generally, as an electrochemical cell 10 defining a microfluidic chip 20.

Dissolved target moieties, such as lanthanides and actinides contained within a first fluid stream is introduced into the microfluidic chip 20 at a pressure adequate to ensure traversal of the stream through the channel defined by the chip. The first fluid, and therefore the moieties, converge with a second, relatively immiscible phase to form a second or modified fluid stream. The immiscibility of the two phases relative to each other causes phase separation, resulting in the formation of distinct droplets within the stream flowing in the microfluidic chip 20. An electrical potential is applied across the microfluidic chip 20, which causes the oxidation or reduction of the desired element. The redox potentials of two exemplary elements which can be separated by the invented method and system are given below (potential given is in comparison to the normal hydrogen electrode):

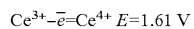

$Ce^{3+} - \bar{e} = Ce^{4+}$  $E = 1.61$ V

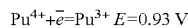

$Pu^{4+} + \bar{e} = Pu^{3+}$  $E = 0.93$ V

The desired element thereby becomes soluble in the second immiscible phase and diffuses into that second immiscible phase. After exiting the microfluidic chip 20, the phases can be separated, whereby the desired element contained in or otherwise isolated within the second phase, while the remaining moieties are sequestered within the aqueous raffinate.

This invention has a particular applicability in rare earth element processing as rare earth metals are difficult to separate given their similar chemical properties. One specific application is in spent nuclear fuel reprocessing where the separation of uranium and plutonium from fission products and other transuranic elements is especially difficult and expensive.

Microfluidic Chip Detail

Figures 3, 4:
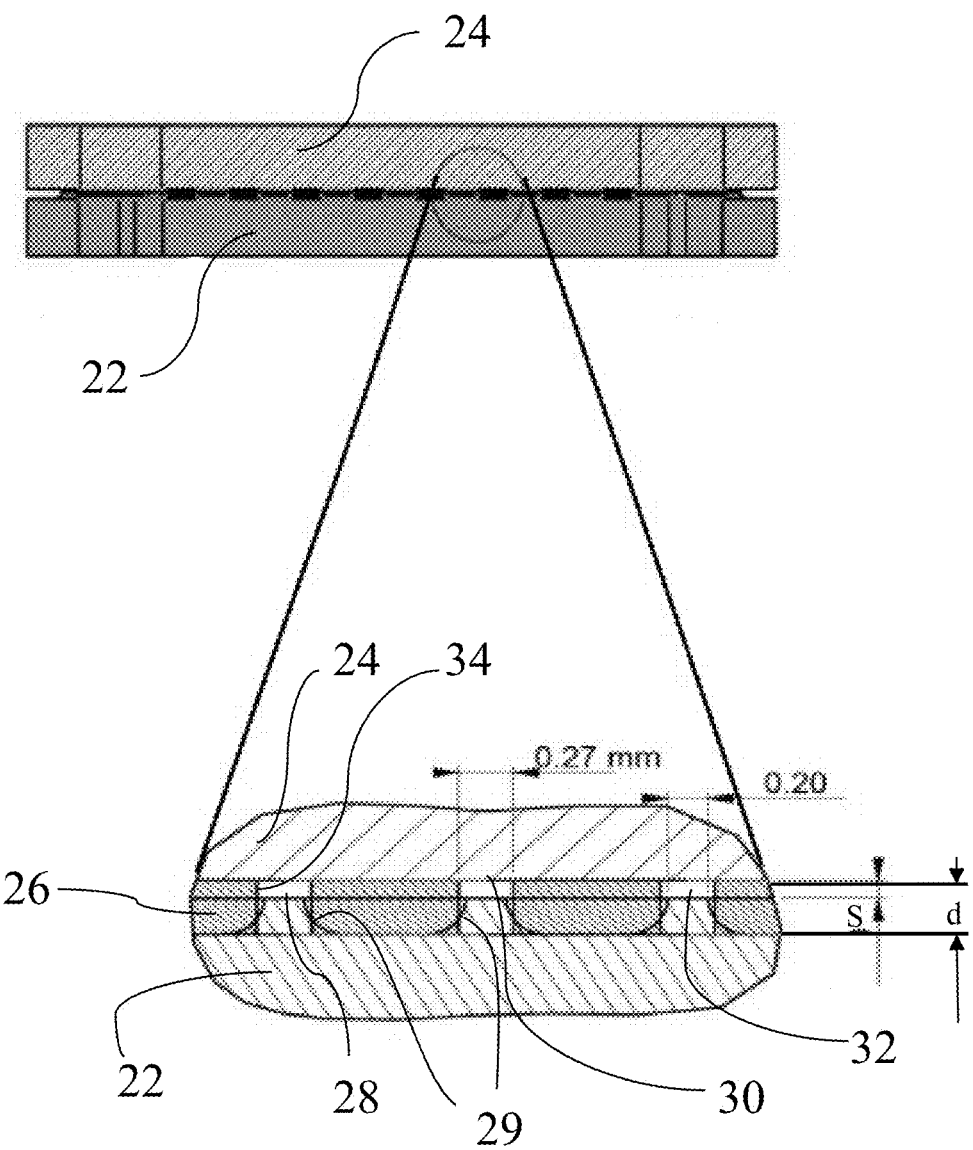
FIG. 3 is a sectional view taken along line 3-3 as depicted in FIG. 2.
FIG. 4 is a detail view of FIG. 3.

As depicted in FIG. 1, the microfluidic chip 20 is comprised of a first electrode 22 (which in an embodiment of the invention defines a generally planar substrate), a second electrode 24 opposing the first electrode, and a gasket 26 disposed between the first and second electrodes. While the first electrode and the second electrode may initially be substantially similar topography (for example both smooth flat surfaces), the first electrode 22 is etched using micro-machining methods to produce a substantially continuous first raised surface 28. The first raised surface is the termination point of upwardly directed ridges 29 which extend from the first surface of the first electrode 22, as depicted in FIG. 3. (One method for etching is applying a photomask to those regions intended to extend above the surface of the first electrode and then exposing non-masked portions of the surface to radiation or chemical means to facilitate etching.)

The opposing surface of the second electrode 24 defines a second relatively smooth surface 30. The first raised surface 28 and the second flat surface 30 comprise two surfaces of a micro-channel 32 such that when the electrodes are combined, a channel is formed which extend through the resulting microfluidic chip 20. The chip embodiment pictured in FIG. 1 shows a serpentine-like channel which serves to maximize the surface area to volume ratio of the reaction chamber defined by the channel. This embodiment depicts the first opposing surface of the first electrode as defining the floor of the channel and the second opposing surface of the second electrode defining the ceiling or top of the channel.

A salient feature of the invention is the provision of a surface area to volume ratio of between 5000 m−1 and 20000 m−1. This depends on the length, width and height of the reaction chamber. A suitable width and height of the micro-channel varies from about 50 microns to 1000 microns. In an embodiment of the invention, the micro-channel has a width of 200 microns and a height of 100 microns, whereby the width is the dimension extending perpendicular to the height of the channel, that height determined by the distance between the floor and ceiling of the channel. The length of the channel is the length of the path which the liquid traverses.

A myriad of materials are suitable as substrates for electrodes. Generally, electrically conductive substrates that are also nonreactive to the fluid streams are preferred. As such, titanium, platinum, copper, silver, gold, boron doped diamond, carbon/graphite, and combinations thereof are suitable substrates given the moieties typically encountered in nuclear process streams. For example, platinum-sputter coated titanium was used to construct the first electrode 22 and second electrode 24 in experiments. Platinum was chosen as the coating to provide increased electrical conductivity while minimizing chemical interactions between the microfluidic chip 20 and fluids flowing therein.

As depicted in FIGS. 1 and 4, a gasket 26 is positioned between the first 22 and second electrode 24 and has a thickness sufficient to prevent physical contact of the electrodes to each other when the electrodes are in close spatial relationship to each other (i.e., when the microchip is assembled). In final microchip assembly, portions of the gasket define opposing surfaces of the channel 32, those surfaces extending generally perpendicular to the channel surfaces defined by the opposing electrodes. As can be seen in FIG. 4, the thickness of the gasket 26 is micro-machined to be greater than the distance between the top of the raised surface 28 of the first electrode 22 and the first opposing surface of the first electrode 22. As such, the gasket will define walls of the channel which extend parallel and coplanar with the first raised surface 28. Inasmuch as the gasket 26 thickness is greater than the height defined by upwardly directed ridges 29 which terminate in the first raised surface 28. The remaining or overtopping portion 34 of the gasket extends beyond the first raised surface 28 to provide a spacer upon which the second opposing surface of the second substrate 24 rests. The resulting space forms the micro-channel 32. The micro-channel 32 can be oblong, circular, or rectangular in its cross-section. As can be seen in FIG. 1, the micro-channel 32 defines a serpentine shape. However, depending on the size of the chip utilized and the length requirements of the separation, a variety of other patterns can be used, such as spirals, straight lines, and a combination of these patterns. Besides helping to define the micro-channel 32, the overtopping portion 34 also prevents electrical contact between the first raised surface 28 and the second flat surface 30.

FIG. 4 demonstrates the relationship among the gasket 26, the first raised surface 28, and the second flat surface 30 in which the micro-channel 32 is created. In an embodiment of the present invention, the gasket 26 creates a space "s" of about 100 microns between the first raised surface 28 and the second flat surface 30. Preferably, the gasket 26 is hydrophobic so as to avoid absorbing the aqueous solution or any of the elements or compounds entrained therein. Suitable material for the gasket includes high temperature and corrosion-resistant material such as perfluoro-elastomer, polyvinylidene fluoride, Teflon®, polypropylene and combinations thereof. For example, perfluoro-elastomer FFKM, was used in experiments given its high temperature and corrosion resistance.

An embodiment of the system uses flowing plugs or droplets in microfluidic channels to determine absolute interfacial mass transfer rate constants under conditions of both rapid mixing and a known interfacial area of between 500 and 20,000 m$^{-1}$.

The microfluidic chip 20 has a first lateral region 40 and a second lateral region 42. Proximal to the first lateral region 40 is a first inlet port 44 and a second inlet port 46. The first inlet port 44 receives an aqueous stream 48, while the second inlet port 46 receives a non-aqueous stream 50; although, either inlet port can be adapted to receive either the aqueous or non-aqueous stream. In a preferred embodiment of the invention, target elements or compounds are dissolved in the aqueous stream 48 as a prelude to the separation process. The first and second inlet ports are positioned from each other to avoid contamination of either fluid with the other prior to the fluids mixing within the confines of the channel.

Figure 2:
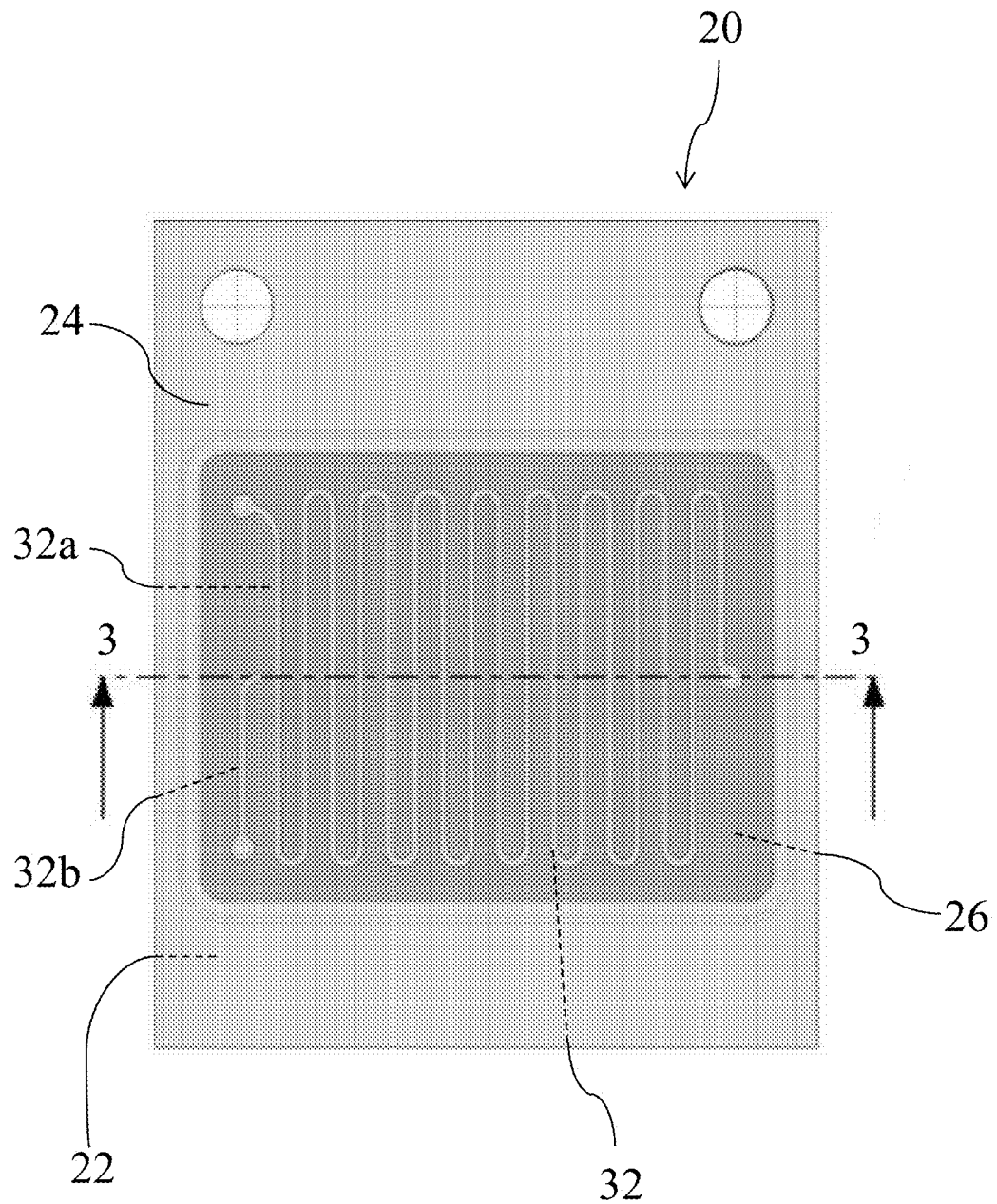
FIG. 2 is a plan view of the present invention.

The first inlet port 44 precedes, and is contiguous with, a first vestibule 32a of the micro-channel 32, and the second inlet port 46 precedes, and is contiguous with a second vestibule section 32b of the micro-channel 32. As depicted in FIG. 2, the vestibules 32a and 32b terminate at a droplet generator point 52 where the aqueous stream 48 and the non-aqueous stream 50 meet to form a confluent stream 54 (heretofore designated as the second fluid stream prior to entry into the main region of the micro-channel 32. Because the aqueous stream 48 (i.e. polar) and non-aqueous (i.e., nonpolar) stream 50 are chosen to be immiscible, the confluent stream 54 in micro-channel 32 phase separates into distinct droplets, or plugs, 56. Thus, the confluent stream 54 will be comprised of aqueous plugs 56a and non-aqueous plugs 56b throughout the length of the micro-channel 32. Generally, by the nature of micelle interaction the polar plugs 56a are separated from each other by nonpolar plugs 56b. In an embodiment of the invention, the non-aqueous stream 50 is an organic stream, such as 30% tri-butyl-phosphate in dodecane (hereinafter "TBP"). TBP is the de facto organic solvent in the reprocessing method known as plutonium and uranium recovery by extraction, or PUREX. Generally however, the invention is operational as long as a first constituent of the confluent stream is more aqueous or polar than a second constituent of the confluent stream. Further, more than two immiscible liquids can make up the confluent stream 54 such that there will be more than two different kinds of plugs 56. For example, the confluent stream may be comprised of three or more plugs, each plug enveloping a different element or moiety from the other two plugs. In such a case, the fluids making up each of the plugs must suitably vary in polarity so as to effectuate extraction and isolation of its target moiety.

As the confluent stream 54 flows through the micro-channel 32 in the microfluidic chip 20, an electric potential is applied across the first electrode 22 and the second electrode 24. In this way, the microfluidic chip 20 defines an electrochemical cell 10 with the first electrode 22 and the second electrode 24 directly contacting the confluent stream 54, such that the confluent stream simultaneously serves as both a moiety transport medium and an electrolyte. However, in the case where microchips are serially arranged, an electric potential may not be applied to each of the chips but rather to selective chips or to all chips but at different times. The applied electric potential oxidizes or reduces the constituents in the electrolyte, which in this case is the confluent stream 54. The oxidation or reduction thereby causes a change in the extraction properties of the constituents in the aqueous plugs 56a and the non-aqueous plugs 56b. For example, under a specific applied voltage, one element dissolved among others in the aqueous plugs 56a can be oxidized. This oxidized element then becomes soluble in the non-aqueous plugs 56b, and the oxidized element will diffuse from the aqueous plugs 56a into the non-aqueous plugs 56b. The voltage applied is specific to the desired element so that the other elements will not oxidize and will remain in the aqueous plugs 56a. Subsequent to this electrical gradient induced redox process, additional polar and/or nonpolar fluids can be added to the process stream to facilitate additional separations of moieties. For a given electrode, the potential that can be applied across surface is dictated by the material on the surface of the electrode. For instance, the potential window for an electrode with a platinum surface is −1 to +2 V. In this way, the range of voltages that can be applied to the electrochemical cell 10 can be varied by selecting an electrode with a different potential window.

The length of the micro-channel 32 depends on the residence time needed for diffusion of the desired element or compound into the alternate phase. In some embodiments, the length of the micro-channel 32 is as little as 1 cm, while in other embodiments the length is as long as 100 cm. As mentioned supra, microchips may be serially arranged to further increase or extend the reaction chamber/micro-channel surface area/volume.

The micro-channel 32 terminates at an outlet port 58 on the second lateral region 42 of the microfluidic chip 20. The confluent stream 54 can be analyzed as is, or, more commonly, the aqueous plugs 56a will be separated from the non-aqueous plugs 56b, the latter of which will be analyzed.

Figure 5:
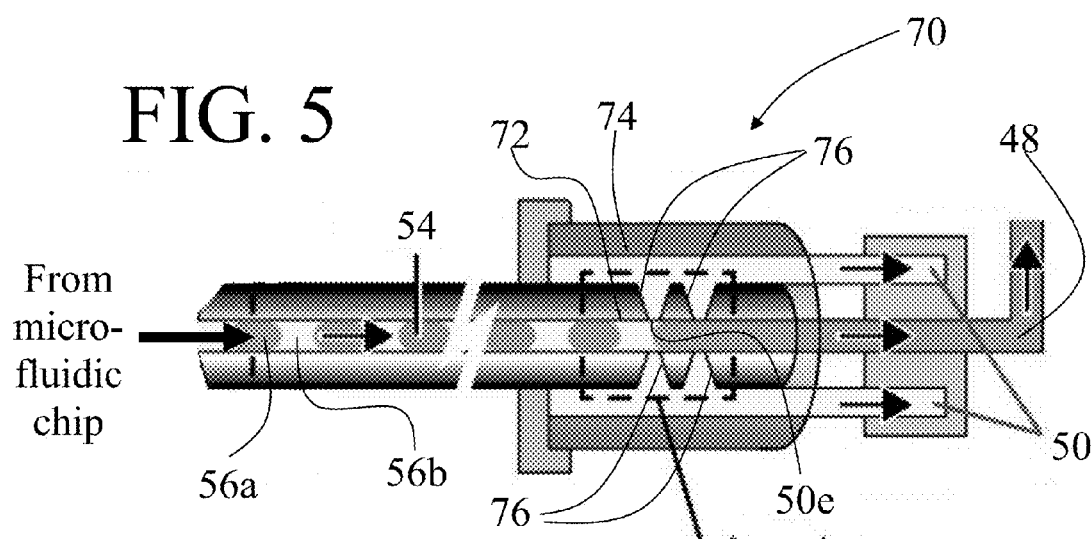
FIG. 5 is a sectional view of a phase separator in accordance with the features of the present invention.
Figure 6:
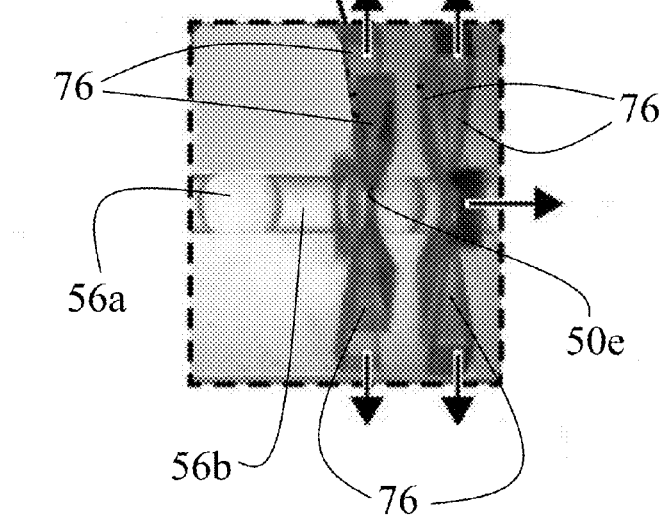
FIG. 6 is a detail view of a withdrawal channel as depicted in FIG. 5.

In the latter case, the confluent stream 54 is separated back into its polar and nonpolar constituents by a phase separator 70 as depicted in FIG. 5. A detailed discussion of the phase separator and the underlying principles can be found in Nichols, et al., Toward a Mechanistic Understanding of Nuclear Reprocessing Chemistries by Quantifying Lanthanide Solvent Extraction Kinetics via Microfluidics with Constant Interfacial Area and Rapid Mixing, J. Am. Chem. Soc. 2011, 133, 15721-15729, the contents of which are hereby incorporated by reference. Specifically, the phase separator 70 divides the confluent stream 54 into an aqueous stream 48 (the raffinate at this point) and a non-aqueous stream 50 containing the target moieties. The phase separator 70 consists of a first inner tube 72 and a second outer tube 74 arranged in a coaxial fashion with the first tube 72. FIGS. 5 and 6 depict withdrawal channels 76 that are micro-machined through the surface of the first inner tube 72 at an angle that is approximately 90 degrees from the longitudinal axis of the first inner tube 72. A myriad of devices are available for such micro-machining, including an excimer laser. In an embodiment of the invention, two sets of five withdrawal channels 76 oriented in parallel to one another are used to separate the aqueous plugs 56a from the non-aqueous plugs 56b.

The phase separator 70 utilizes capillary pressure to separate the aqueous and non-aqueous phases. In order for the phases to separate completely, the driving pressure of the aqueous stream 48 as it approaches the non-aqueous stream egress point 50e should be less than the capillary pressure of the withdrawal channel 76. Capillary pressure enables the nonaqueous phase to exit through the channel but not the aqueous phase. Further, the flow rate of the non-aqueous phase in the confluent stream 54 as it approaches the non-aqueous stream egress point 50e should be equal to the flow rate of the non-aqueous stream 50 that is siphoned into the withdrawal channel 76. In an embodiment of the invention, the channels are shaped as venturis to effectuate a low pressure region within the venturis, thereby facilitating even more efficient extraction. The following equation was used to determine the radius of curvature for the withdrawal channel 76:

$$R_0 = \frac{-2\gamma\cos\theta}{\left(\frac{8\mu_{aq}L_1Q_{aq}}{\pi R_1^4} + \frac{8\mu_{org}L_2Q_{org}}{\pi R_2^4}\right)}$$

where $R_0$ is the radius of curvature of the withdrawal channel; $\gamma$ is the aqueous/non-aqueous interfacial surface tension; $\theta$ is the contact angle of the aqueous droplet on the surface of the tubing in the bulk non-aqueous phase; $\mu_{aq}$ and $\mu_{org}$ are the viscosity of the aqueous and non-aqueous phase, respectively; $L_1$ and $R_1$ are the length and radius, respectively, of the confluent stream 54 tubing; $Q_{aq}$ and $Q_{org}$ are the flow rates of the aqueous and non-aqueous phases, respectively; and $L_2$ and $R_2$ are the length and radius, respectively, of the withdrawal channel 76.

In one embodiment, the radius of curvature of the confluent stream tubing 54 to attain a non-aqueous flow rate of 100 μL/min was found to be approximately 1 micron. There, the aqueous phase flow rate was in a 1:1 ratio with the non-aqueous phase. The aqueous phase was a mixture of fourteen lanthanides and yttrium in 1 M ammonium citrate and 0.05 M pentetic acid. The non-aqueous phase was 1 M HDEHP in dodecane. The length of the confluent stream 54 was 88 mm with an internal radius of 63 microns.

By modeling the radius of curvature of the withdrawal channel 76 on the above equation, the inventors achieved a separated aqueous stream 48 of greater than about 99.99% purity. After separation, the aqueous stream egress point 48 or the non-aqueous stream egress point 50 can be analyzed as part of an on-line monitoring system, or individual aliquots can be removed for analysis.

Microfluidic Chip
Fabrication Detail

A myriad of methods exist for constructing the microfluidic trip. For example, an exemplary system for construction has been developed by The Dolomite Centre Ltd (Royston, United Kingdom). Briefly, that system comprises a base clamp, a top clamp, and electrical connectors. The clamp system allows for ease of handling the microfluidic chip as well as supplying the voltage across the electrodes. The following discussion and figures are directed to this clamp system.

In an embodiment of the invention, the microfluidic chip 20 is mounted between a base clamp 100 and a top clamp 102. The microfluidic chip 20 is substantially the same as the previous embodiment except that alignment holes 80a and 80b (FIG. 7B) are machined into the first electrode 22 and alignment holes 80c and 80d are machined into the second electrode 24.

As depicted in FIG. 7A, the base clamp 100 has a first surface 104 and a second surface 106. The first surface 104 features a first alignment post 108a that corresponds to alignment holes 80a and 80c formed into opposing surfaces of the top clamp and a second alignment post 108b that corresponds to alignment holes 80b and 80d. Preferably the alignment posts 108a and 108b are made of a non-conductive material so as to avoid shorting the first electrode 22 and the second electrode 24. The first surface also features a first inlet conduit 110, a second inlet conduit 112, and an outlet conduit 114, which correspond to the first inlet port 44, the second inlet port 46, and the outlet port 58 of the microfluidic chip 20, respectively. The conduits run through the thickness of the base clamp 100 from the first surface 104 to the second surface 106. The conduits facilitate the flow of the aqueous stream 48 and non-aqueous stream 50 into the microfluidic chip 20 and the flow of the confluent stream 54 out of the microfluidic chip 20.

Further provided on the first surface 104 are holes 116a and 116b which are designed to mate with the top clamp 102. Lastly, an electrical connection 118 is provided on the first surface 104. If the electrical connection 118 is placed on the base clamp 100 instead of on the microfluidic chip 20, the only limitation on material choice is that the base clamp 100 must be a conductive material. For example, stainless steel is suitable base clamp material, but other suitable materials exist.

The top clamp 102 has a general U-shaped construction so as to accommodate the microfluidic chip 20 while still engaging the base clamp 100. The top clamp has a first leg 120a that is adapted to engage an aperture or hole 116a of the base clamp 100 and a second leg 120b that is adapted to similarly engage an aperture or hole 116b of the base clamp 100. Such adaptation can be in the form of a snap-lock mechanism, a threaded connector, or a locking pin. In the embodiment depicted in FIG. 7E, the top clamp 102 is secured to the base clamp 100 via a threaded connector. A wrench 122 is used to reversibly attach the top clamp 102 to the base clamp 100. In FIG. 7E, the wrench 122 is a "rabbit-ear" wrench, selected for the ease and quickness of assembling and disassembling the cell with manual power.

The top clamp 102 should be made of a non-conductive material if the base clamp 100 is made of a conductive material, thereby avoiding a short between first electrode 22 and second electrode 24. Such non-conductive material includes, but is not limited to Polyether ether ketone (PEEK), polycarbonate, and Teflon®. For example, PEEK was selected as the material for construction of the top clamp 102 because it is also resistant to radiation damage. Since the top clamp 102 in this embodiment is non-conductive, a second electrical connection 124 is provided, which extends through the thickness of the top clamp 102 to the second electrode 24. As depicted in FIG. 7E, the electrical connection 124 is a steel screw.

As can be seen in FIG. 7B, the first electrode 22 of the microfluidic chip 20 is placed on the base clamp 100. The first raised surface 28 is placed facing away from the first surface 104. The alignment holes 80a and 80b slide over the first guidepost 108a and the second guidepost 108b, respectively.

Figure 7D:
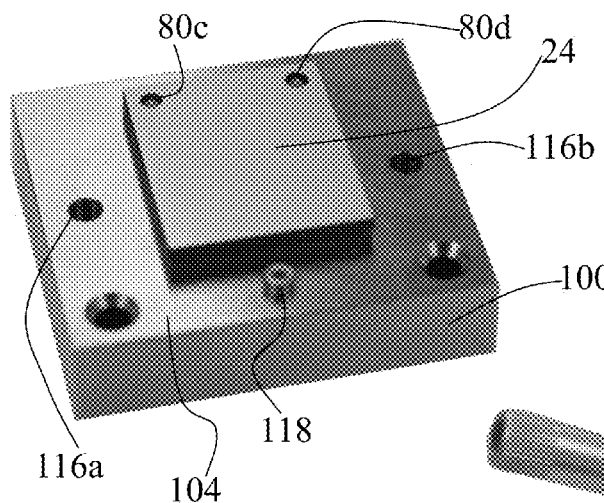
Figure 7E:
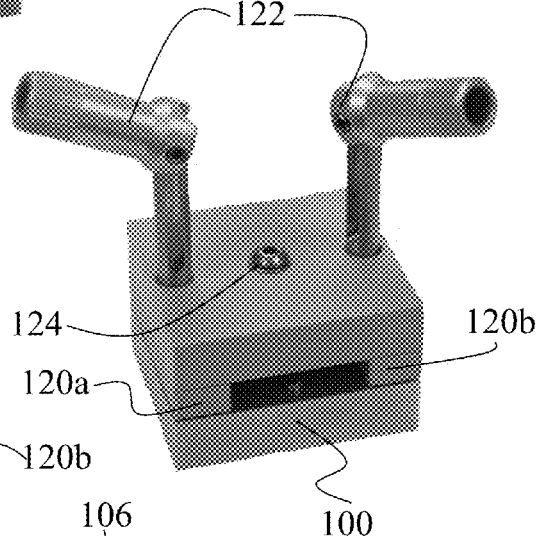

According to FIG. 7C, the gasket 26 is then placed over the first electrode 22. Next, as shown in FIG. 7D, the second electrode 24 is place over the gasket 26 with the second flat surface facing the gasket 26. Alignment holes 80c and 80d of the second electrode 24 slide over the alignment posts 108a and 108b, respectively.

As depicted in FIG. 7E, the top clamp 102 is placed over the second electrode 24 and securely fastened to base clamp 100 via wrench 122.

Figure 7F:
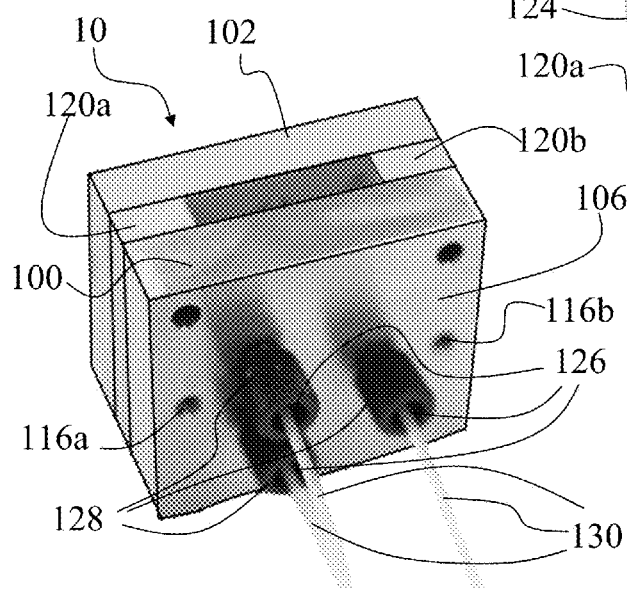

Fluidic connections 126 are made with the first inlet conduit 110, the second inlet conduit 112, and the outlet conduit 114. As shown in FIG. 7F, the fluidic connections 126 are compression fittings 128 and tubing 130. The tubing 130 used in this embodiment is 1/16 inch Teflon® FEP tubing. Finally, wires are attached to the first electrical connection 118 and the second electrical connection 124 to close a circuit between the electrochemical cell 10 and a voltage regulator.

Applications

The present invention has great applicability as a system for electrochemically separating lanthanides and actinides in rare earth processing or in nuclear fuel reprocessing. Experimentation has been performed in extracting aqueous cerium in 1 M nitric acid. The cerium entered the microfluidic chip 20 at an oxidation state of +3, a state at which cerium is not soluble in an organic solvent. The redox potential for cerium III to oxidize to cerium IV in 1 M nitric acid is 1.61 V. Thus, an electrical potential of 1.8 Volts was applied across the first electrode 22 and the second electrode 24, which caused the cerium to oxidize to the +4 state. In the +4 state, the cerium was extractable by TBP. A similar separation was accomplished in which europium was selectively separated from other lanthanides.

Another example a separation that the inventors expect to achieve is that of americium from curium and lanthanide elements. These elements are often found together in aqueous mixtures as part of a spent nuclear fuel reprocessing stream. These elements would be dissolved in aqueous solution in the +3 oxidation state. However, americium (III) has a redox potential of 1.70 V to become americium (VI). Thus, under an applied potential of 2 V, the americium should oxidize to the +6 state. Americium, in the higher oxidation state, should then diffuse into the organic phase, TBP. Thus, americium could be selectively extracted from lanthanides and curium as part of the spent nuclear fuel reprocessing.

In some embodiments of the invention, the microfluidic chip is permanently mounted to a lanthanide/actinide process stream. In this way, the composition of the process stream can be monitored on-line, at-line, and in a real time system.

The presently invented system further lends itself to other arenas of investigation. Similar redox manipulations can be performed with pharmaceuticals, especially those that change from hydrophilic to lipophilic; biological substances; noble metals, including platinum, palladium, and rhodium among others; and fine chemicals. The range of potential objects for investigation is limited primarily by those objects with redox potentials within the hydrogen/oxygen thermodynamic range for aqueous media.

Generally the invented method and system allows for aliquots of between 5 and 50 microliters (and preferably between 10 and 20 microliters) to be extracted and analyzed from process streams for real time determination of target moiety concentrations. Separations in under about one minute are often obtained. Alternatively, fluids can be continuously extracted from a process stream and drip fed or otherwise subjected to the invented system.

Figure 8:
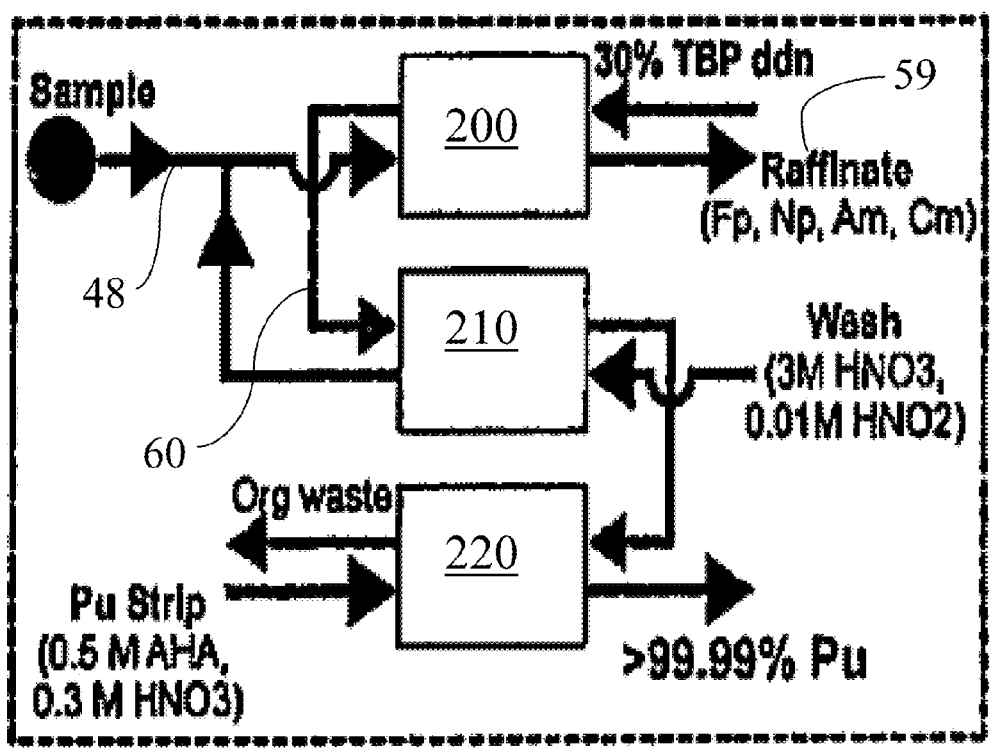
FIG. 8 is a diagram of a multi-microfluidic chip system in accordance with the features of the present invention.

In another embodiment, multiple microfluidic chips can be combined in series as depicted in FIG. 8. In this embodiment, the separations do not take place electrochemically. Instead, the addition of chemicals achieves the desired oxidations or reductions. A possible use for such a system can be found in nuclear waste treatment facilities. For example, in an activity assay to determine plutonium concentration from a typical reprocessing plant product stream, the uranium must be removed prior to radiometric analysis. The invented system allows for 99.99% of the plutonium in the initial product stream to be isolated for analysis.

In an embodiment of the invented method and system, reprocessing of nuclear fuels begins by dissolving the spent fuel in a first stream (not shown) of hot, concentrated nitric acid. This aqueous product stream 48 flows into a first microfluidic chip 200. There, TBP is introduced and droplets, or plugs (i.e., micelles), are created via micelle action. The uranium and plutonium in the spent fuel are extracted in the TBP, while fission products and transuranics, such as neptunium, americium, and curium, remain in the remaining aqueous phase (i.e. the raffinate 59). At the phase separator, the raffinate aqueous phase is diverted, thereby removing the fission products and transuranics. The aqueous phase can be retained for further separation and investigation or disposed. The uranium- and plutonium-containing TBP stream 60 then flows to a second microfluidic chip 210.

A second aqueous stream of 3 M nitric acid and 0.01 M nitrous acid is introduced into the second microfluidic chip 210 and combines to form droplets with the TBP stream from the first microfluidic chip 200. Any trace amounts of neptunium, americium, and curium in the TBP diffuse into the second aqueous stream. At the phase separator of the second microfluidic chip 210, the aqueous phase is again diverted. In some embodiments, the aqueous phase is combined with the product stream that is flowing into the first microfluidic chip 200. The TBP stream next flows to a third microfluidic chip 220.

In the third microfluidic chip 220, the plutonium is selectively stripped from the TBP, which retains the uranium. A third aqueous stream composed of 0.5 M acetohydroxamic acid (AHA) and 0.3 M nitric acid is introduced into the third microfluidic chip 120. The AHA selectively forms complexes with plutonium, thereby stripping plutonium from the organic TBP phase. When the aqueous and organic phases are diverted at the final time, more than 99.99% of the plutonium in the initial product stream is present in the reconstituted third aqueous stream.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

In summary, the invented method and system facilitate oxidation/reduction of target moieties in a real time analytical protocol. Both organic and aqueous solutions enter the chip. The chip is made of two electro-conductive plates, connected to a power supply/battery. (The chip may be arranged in series other chips to form a plurality of chips. Alternatively, a single chip defining a plurality of channels is provided for counter-current fluid dynamics. In either the multi-chip paradigm or the single chip-multiple channel paradigm, unit operations are facilitated.) A certain electric potential is applied, and the electro-active species in the solution are either oxidized or reduced by drawing or delivering the electrons from/to the solution by one of the plates. A membrane may be used to prevent a reversible process of the other plate. The change of the oxidation occurs during flow of the moieties through the chip, and the species change their extraction properties. Thus, by changing the oxidation state on the chip, we also can extract (or strip) the species into the organic phase (or strip it from the organic phase). For example, Ce enters the chip in the aqueous phase as Ce(+3), which is not extractable by the organic phase 30% tri-butyl phosphate in dodecane, aka PUREX solvent. An applied electrical field results in oxidation of the Ce(+3) to Ce(4+), upon which the Ce is extractable by TBP, and Ce is transferred into the organic phase. The invention facilitates similar manipulations with Pu and other electro-active species, including drugs.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A system for solvent extraction, said system comprising:
   a. a first electrode with a first surface and a second surface, wherein a raised area is formed on the first surface of said first electrode such that the raised area of the first surface of the first electrode was not substantially etched during fabrication and wherein the raised area defines one surface of a four-sided microfluidic channel;
   b. a second electrode with a first surface and a second surface, wherein the second surface is flat and wherein the second surface defines a surface of the microfluidic channel that opposes the raised area of the first electrode;
   c. a reversibly deformable substrate disposed between the first surface of said first electrode and the second surface of said second electrode, wherein the substrate is adapted to accommodate the raised area on the first surface of the first electrode and wherein said substrate has a portion that extends beyond the raised area of the first surface of the first electrode, wherein the portion that extends beyond the raised area defines the remaining two sides of the microfluidic channel; and
   d. a liquid electrolyte that flows through the microfluidic channel, wherein said liquid electrolyte is comprised of at least two immiscible liquids and wherein at least one immiscible liquid has at least two dissolved constituents.

2. The system of claim 1 further comprising a phase separator, wherein said phase separator separates the at least two immiscible liquids into separate streams upon exiting the microfluidic channel.

3. The system of claim 1, wherein the at least two immiscible liquids are an organic liquid and an aqueous liquid.

4. The system of claim 3, wherein the at least two dissolved constituents are in the aqueous liquid.

5. The system of claim 3, wherein the aqueous liquid is part of a nuclear fuel reprocessing stream.

6. The system of claim 4, wherein an electrical potential is applied across the first electrode and the second electrode so as to selectively oxidize a constituent so as to make the constituent more soluble in the organic liquid.

7. The system of claim 1, wherein the at least two dissolved constituents is a mixture of lanthanides.

8. The system of claim 1, wherein the at least two dissolved constituents is a mixture of actinides.

9. The system of claim 1, wherein the at least two dissolved constituents is a mixture of actinides and lanthanides.

10. The system of claim 1, wherein the at least two dissolved constituents are any electro-active species with a redox potential within the hydrogen/oxygen thermodynamic range for aqueous media.

11. The system of claim 1, wherein the at least two constituents are biological substances.

12. The system of claim 1, wherein the at least two constituents are pharmaceutical compounds.

13. The system of claim 1, wherein the at least two constituents are noble metals.

14. The system of claim 1, wherein the microfluidic channel has a width between 100 and 300 microns.

15. The system of claim 1, wherein the portion that extends beyond the raised area is between 1 and 150 microns.

16. A system for performing liquid-liquid extraction, said system comprising a number of devices enabling a plurality of unit operations, said devices comprising:
   a. a first plate with a first surface and a second surface, wherein a raised area is formed on the first surface of said first plate such that the raised area of the first surface of the first plate was not substantially etched during fabrication and wherein the raised area defines one surface of a four-sided microfluidic channel;
   b. a second plate with a first surface and a second surface, wherein the second surface is flat and wherein the second surface defines a surface of the microfluidic channel that opposes the raised area of the first plate;
   c. a gasket disposed between the first surface of said first plate and the second surface of said second plate, wherein said gasket is adapted to accommodate the raised area on the first surface of the first plate and wherein said gasket has a portion that extends beyond the raised area of the first surface of the first plate, wherein the portion that extends beyond the raised area defines the remaining two sides of the microfluidic channel; and
   d. a liquid that flows through the microfluidic channel, wherein said liquid is comprised of at least two immiscible liquids and wherein at least one immiscible liquid has at least two dissolved constituents; and
   e. a phase separator, wherein the phase separator separates the at least two immiscible liquids into separate streams upon exiting the microfluidic channel.

17. The system of claim 16, wherein the number of devices is three with the devices arranged in series to each other.

18. The system of claim 17, wherein the at least two immiscible liquids of the first device are an aqueous nuclear fuel reprocessing stream and 30% tri-butyl-phosphate in dodecane.

19. The system of claim 18, wherein the at least two immiscible liquids of a second microfluidic device are 3 M nitric acid, 0.01M nitrous acid, and the phase separated stream of 30% tri-butyl-phosphate in dodecane from the first microfluidic device in the series, and wherein the at least two immiscible liquids of the third microfluidic device are 0.3 M nitric acid, 0.5 M acetohydroxamic acid, and the phase separated stream of 30% tri-butyl-phosphate in dodecane from the second microfluidic device in the series.

20. The system as recited in claim 16 wherein the number of devices is one and the number of unit operations is more than one.

* * * * *